F. BERENSTEIN.
FRICTION AND METAL PLUG FOR RUBBER HEELS AND OTHER TREAD SURFACES.
APPLICATION FILED JUNE 18, 1915.
1,155,874. Patented Oct. 5, 1915.
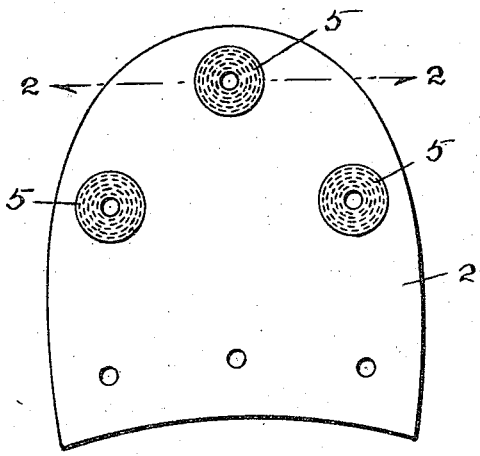
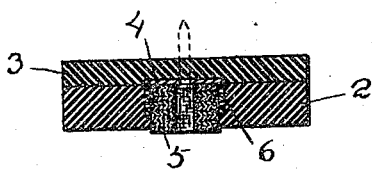
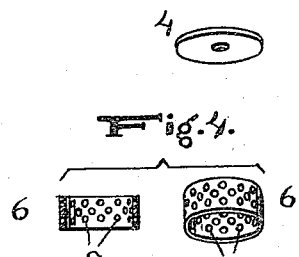
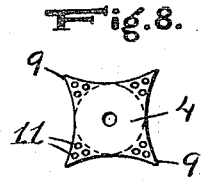
Inventor,
Frank Berenstein.
Witness
Stuart Hilder.

UNITED STATES PATENT OFFICE.

FRANK BERENSTEIN, OF CHELSEA, MASSACHUSETTS, ASSIGNOR OF ONE-HALF TO WILLIAM BERNSTEIN, OF BOSTON, MASSACHUSETTS.

FRICTION AND METAL PLUG FOR RUBBER HEELS AND OTHER TREAD-SURFACES.

1,155,874.   Specification of Letters Patent.   Patented Oct. 5, 1915.

Application filed June 18, 1915.   Serial No. 34,784.   REISSUED

*To all whom it may concern:*

Be it known that I, FRANK BERENSTEIN, a citizen of the United States, resident of Chelsea, in the county of Suffolk and State of Massachusetts, have made a certain new and useful Invention in Friction and Metal Plugs for Rubber Heels and other Tread-Surfaces; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a bottom plan view of a heel having the invention applied thereto. Fig. 2 is a section on the line 2—2, Fig. 1. Fig. 3 is a detail perspective view of the back plate. Fig. 4 shows detail perspective and cross sectional views of the hollow cylinder or band. Fig. 5 is a detail perspective view of the canvas plug. Fig. 6 shows detail perspective and cross sectional views of a modification wherein the hollow cylinder and the back plate are made in one piece, with perforations in the back plate as well as in said cylinder. Fig. 7 is a detail perspective view of the same with the back plate solid, except for the center nail hole. Fig. 8 is a detail plan view of a modification having radial lugs upon the back plate, said lugs being pointed. Fig. 9 is a detail cross section of the same showing the lugs bent down and their points turned inward into engagement with the plug (dotted). Fig. 10 is a plan view of a further modification wherein the radial lugs are in greater number and of flaring form. Fig. 11 is a detail cross section of the same showing the lugs bent downward. Fig. 12 is a sectional detail view showing the ragged edges of the holes forming clutch means of engagement with the canvas plug.

The invention has relation to a friction and metal plug for rubber heels and other tread surfaces, having for its object certain improvements upon the Patent No. 1,129,672, Feb. 23, 1915, of S. J. Harris, the object being to accomplish the same results with greater economy of manufacture, as, in the case of the patent referred to, the dies and the plugs themselves are too expensive.

The invention consists in the novel construction and combinations of parts, as hereinafter set forth.

In the accompanying drawings, illustrating the invention, the numeral 2 designates the wear lift of the rubber heel to which the invention is shown as applied, and 3 the upper lift of said heel.

The plug, in the present case, consists of a back plate or metal frame plate 4, usually of circular form, of about the same diameter as that of the plug proper, 5, wound from a strip of frictionized canvas or other suitable rubber-coated material, means being provided exteriorly of the plug for holding the plug in position in its seat in the heel, said means consisting preferably of an exterior circular band or hollow cylinder 6, surrounding the plug and at its upper end being in contact with said back plate 4, said circular band or hollow cylinder having means for engagement with the plug, as points 7, 7, struck inward from said band into the plug, to hold the plug in its place in the heel at all times, it being understood that the circular band is either turned down from said back plate, as a part thereof, or, if loose and unconnected from said plate, is provided with a number of perforations 8, 8 therein, which, in the vulcanization, will admit the rubber of the heel proper and the rubber of the canvas plug, to hold the circular band in place, said band in its turn having engagement with the plug, to hold the plug in place.

It is preferred to make the entire device in thimble or shallow dish form, with one stroke of a die, said die forming perforations not only in the circular band or flange of the thimble but also in the back plate thereof.

The plug, in the present case, is not provided with a metal post or lining, as in the patent, the fastening nail having its head engaged directly with the central perforation of the hollow cylindrical plug, and its shank engaged with the center perforation of the metal back plate.

The perforation of the back plate is of smaller size than that of the plug, and is provided with a marginal portion overlying the top of the perforation of the plug and adapted to be engaged by and backing up the head of said nail.

In Fig. 8 of the drawings a modification of the invention is shown wherein the hollow cylinder or band is omitted, and the back plate is provided with radial projections or lugs 9, bent down at right angles to the back plate and having engagement with the canvas plug to hold it in place, said engagement being effected by clutch points 10, struck inward from said lugs to enter the plug, or by turning the points of the lugs into engagement with the plug, or by the rubber of the heel proper and the rubber of the coated plug flowing into the perforations 11, of said lugs and effecting a rubber lock.

The clutch points are conveniently made when the perforations are struck into the device, leaving ragged or rough edges upon the inside.

The metal back plate and the hollow cylinder or band may be either perforated or not as desired. This is also true of the modification having the radial lugs.

I claim:—

1. In a rubber heel having a perforation or recess, a hollow cylindrical plug of rubber coated fabric material located within and cemented to the side walls of said recess, a metal back plate extending across and having bracing engagement with the top of said plug, the interior diameter of said plug being comparatively large to receive the head of a fastening device, and said back plate having a central perforation of small size to receive the shank of said device, the marginal portion of said plate surrounding the central perforation thereof extending across the interior cavity of said plug and acting as a backing for the head of said device, and metallic means located exteriorly of and engaging said plug to hold it in place.

2. In a rubber heel having a recess, a hollow cylindrical plug of rubber coated fabric material located within and cemented to the side walls of said recess, a metal back plate extending across and having bracing engagement with the top of said plug, the interior diameter of said plug being comparatively large to receive the head of a fastening device and said back plate having a central perforation of small size to receive the shank of said device, the marginal portion of said plate around said central perforation extending across the interior cavity of said plug and acting as a backing for the head of said device, and metallic means located exteriorly of said plug and having perforations therein, the rubber of the heel proper and the rubber of the coated plug entering said perforations in the vulcanization of the heel and effecting a rubber lock for said plug.

3. In a rubber heel having upper and lower lifts and a perforation or recess, a hollow cylindrical plug of rubber coated material located within and cemented to the side walls of said recess, a metal back plate extending across and having bracing engagement with the top of said plug, said plate located at the joint of the lifts, the interior diameter of said plug being comparatively large to receive the head of a fastening device, and said back plate having a center perforation of small size to receive the shank of said device, the marginal portion of said plate surrounding the central perforation thereof extending across the cavity of the plug and acting as a backing for the head of said device, and a metallic band located exteriorly of said plug and provided with perforations, the rubber of the heel proper and the rubber of the coated plug entering said perforations in the vulcanization of the heel and effecting a rubber lock for said plug.

In testimony whereof I affix my signature, in presence of two witnesses.

FRANK BERENSTEIN.

Witnesses:
GEORGE M. ANDERSON,
S. C. HILL.

Copies of this patent may be obtained for five cents each, by addressing the "Commissioner of Patents, Washington, D. C."